United States Patent [19]
Jenkins

[11] 3,866,837
[45] Feb. 18, 1975

[54] SPRAY ARM BEARING
[75] Inventor: Thomas E. Jenkins, Louisville, Ky.
[73] Assignee: General Electric Company, Louisville, Ky.
[22] Filed: Oct. 15, 1973
[21] Appl. No.: 406,647

[52] U.S. Cl.................. 239/261, 239/264, 134/176
[51] Int. Cl............................................. B05b 3/06
[58] Field of Search .......... 239/254, 259, 261, 264; 134/176, 179; 308/135, 227

[56] References Cited
UNITED STATES PATENTS

| | | | |
|---|---|---|---|
| 2,631,061 | 3/1953 | Nelson | 239/264 X |
| 3,288,156 | 11/1966 | Jordan et al. | 123/176 |
| 3,599,872 | 8/1971 | Guth | 239/261 |
| 3,672,573 | 6/1972 | Morgan | 239/261 |
| 3,776,465 | 12/1973 | Baker | 239/261 X |

Primary Examiner—M. Henson Wood, Jr.
Assistant Examiner—John J. Love

[57] ABSTRACT

A dishwashing machine having a thrust bearing disposed between a stationary hub member and a rotating spray arm support member providing a liquid inlet for receiving an extensible spray tower.

3 Claims, 2 Drawing Figures

PATENTED FEB 18 1975 3,866,837

SPRAY ARM BEARING

BACKGROUND OF THE INVENTION

Field of Invention

This invention relates generally to a dishwasher spray arm support member mounted on a stationary hub member that provides the liquid inlet to the spray arm and more particularly to the provision of a thrust bearing located between the stationary hub member and the spray arm support member. The bearing is arranged around the outside of the hub member, and as a result, allows a clear passage for the liquid passing through said liquid inlet. An extensible and retractable spray tower is located in the passage. The diameter of the bearing member as applied to the support structure of the present invention provides even rotation of the spray arm assembly when the thrust of the liquid causes engagement of the thrust bearing between the stationary hub and the spray arm support member.

2. Description of the Prior Art

U.S. Pat. No. 3,077,200 discloses a dishwasher spray arm that is mounted on a single centrally located support spindle, which can cause the spray arm to rotate unevenly when the thrust of liquid entering the spray arm causes its rotation. When prior art devices as disclosed in U.S. Pat. No. 3,077,200 employ extensible and retractable spray towers, housings are generally provided above the spray arm to hold the towers in their retracted position. These housings because of pump design, typically project above the spray arm and into the area occupied by the lower dishrack and thus, the lower dishracks are usually provided with tunnels or cutouts so the racks can be moved out of the tub area for loading or unloading. While the above arrangement produces satisfactory dishwasher operation, it also results in a reduction of dishrack capacity.

SUMMARY OF THE INVENTION

By this invention there is provided a dishwashing machine including a tub for receiving articles to be washed and a spray arm rotatably arranged in said tub for spraying liquid onto the articles to be washed. A stationary hub member mounted in the tub defines a liquid inlet for supporting an extensible spray tower and a spray arm support member is mounted on the hub for rotation relative thereto. An annular retaining flange on the hub is disposed to project toward the support member and an annular support flange on the support member is disposed to project toward the hub member. A bearing is arranged between the flanges for allowing rotation of the spray arm support member when the thrust of liquid through the hub member causes axial movement of the support member and engagement of the bearing between the flanges.

DESCRIPTION OF THE PREFERRED EMBODIMENTS

Figure 1:
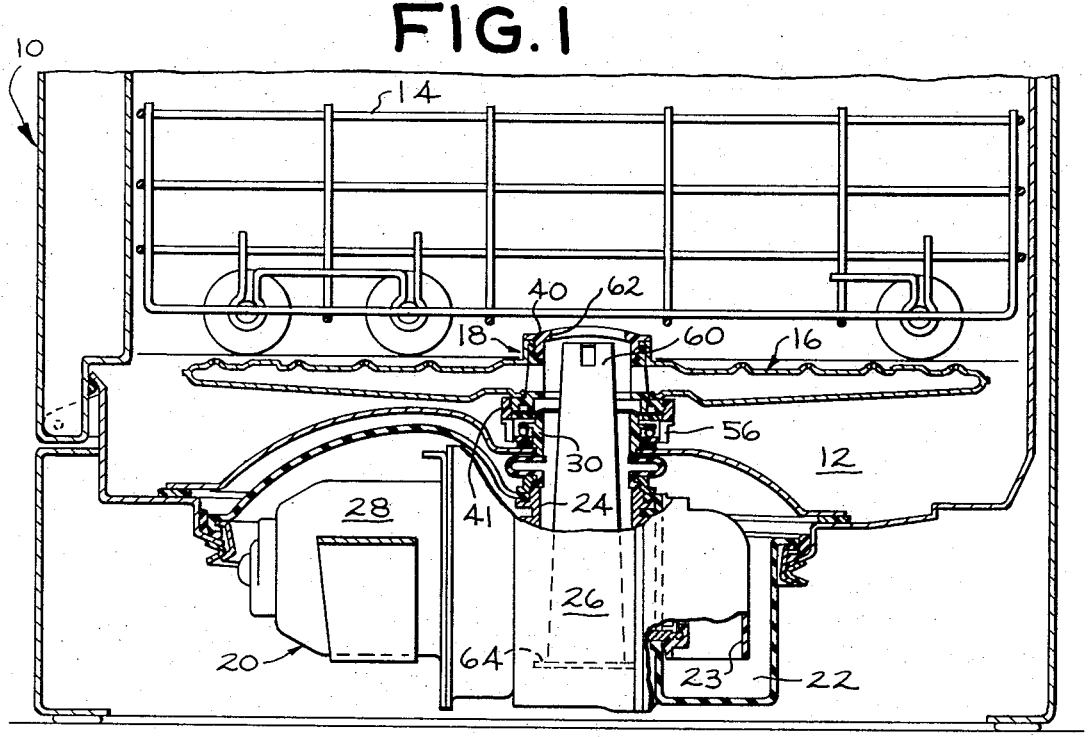
FIG. 1 is a sectional view of a dishwasher showing an embodiment of the spray arm support of the present invention.

Referring to FIG. 1 there is illustrated a dishwasher 10 comprising a tub or wash chamber 12, an article holding rack 14, a spray arm 16 mounted on support means 18 for spraying washing liquid toward the rack 14 and a pump-motor arrangement 20 for delivering washing liquid to the spray arm 16.

Figure 2:
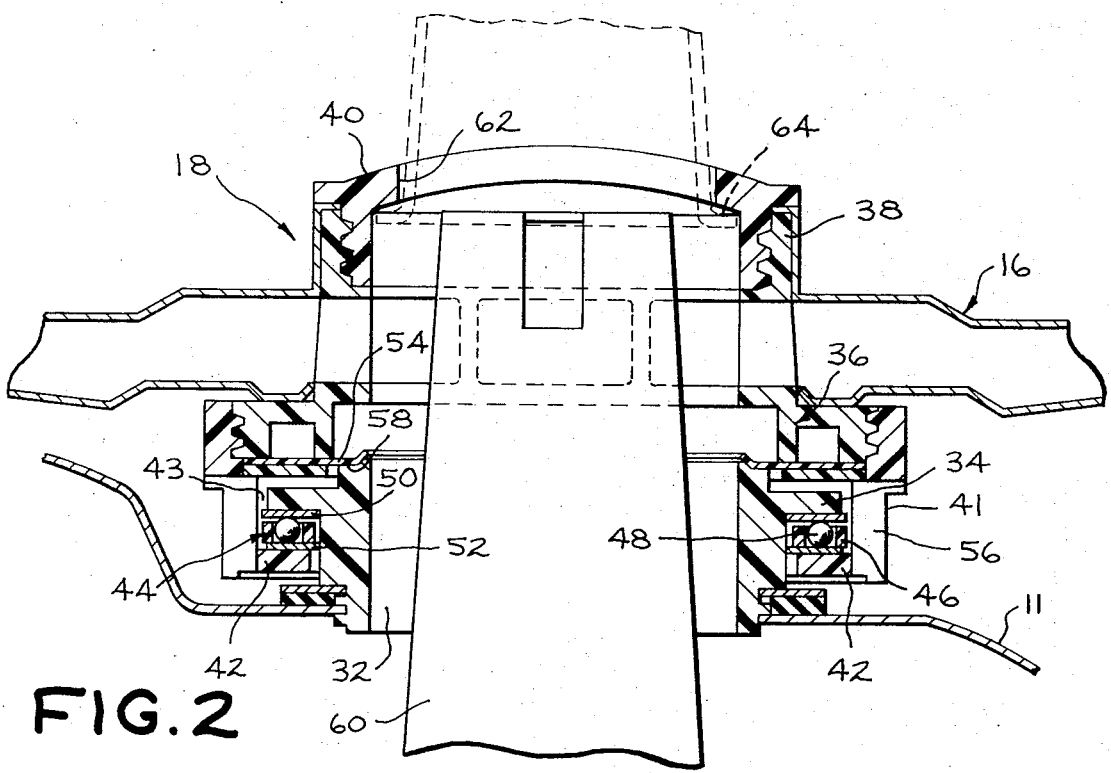
FIG. 2 is a vertical sectional view of the spray arm support mechanism of the present invention.

The pump-motor 20 is of the type illustrated and described in co-pending application Ser. No. 396,823 filed September 9, 1973, assigned to General Electric Company assignee of the present invention. Generally, the pump-motor 20 comprises a sump 22 for receiving liquid from the tub 11 a liquid inlet 23 and an outlet area 24 for receiving liquid directed by a pump 26 driven by a motor 28. Referring to FIG. 2, the liquid from the pump 26 is received by a hub or stud conduit 30 which is provided with a threaded portion received and secured in an opening on the bottom wall of tub 11. The hub 30 includes an interior liquid receiving passage 32, and a circumferentially disposed external flange or retaining member 34 projecting radially outwardly therefrom. A support member 36 which includes a collar 38 is mounted as will be hereinafter described in detail on the hub 30. The spray arm 16 is mounted on the collar 38 and held therein by a cap member 40. Accordingly, the hub 30 transmits liquid from the pump through the support member 36 and into the interior passage of spray arm 16. The support member 36 includes a circumferentially disposed wall 41 spaced from the hub 30 to provide an area 43. The wall 41 has formed thereon an interiorly projecting flange or support means 42 which is disposed below the retaining member 34.

In accordance with the present invention the area between the flange 34 and 42 acts to captivate a friction reducing thrust bearing 44. The bearing 44 comprises a retainer ring 46 which has a plurality of circumferentially spaced ball bearings 48 arranged therein. While in one form of the invention four ball bearings 48 are used, any number may be employed. The hub 30, support member 36 and retainer ring 46 are conveniently molded of plastic. In order to prevent the ball bearing 48 from marring the bearing surfaces of the flanges 34 and 42 there is provided annular thrust plates 50 and 52 that are interposed between the ball bearings 48 and the flanges 34 and 42 respectively. As can easily be understood when pressurized liquid from the pump outlet 24 is transmitted to the spray arm 16, the support member 36 is moved axially upward relative to the hub 30. The axial movement of the support member 36 causes the flange 42 to be driven into engagement with flange 34 through bearing 44. The use of a friction reducing ring thrust bearing 44 outside of the dimension of the liquid inlet allows greater stability of the spray arm support member 36 due to the ratio between the diameter of the bearing 44 relative to the height of the spray arm support member 36. With the arrangement of the present embodiment the thrust of the washing liquid entering hub 30 maintains the support member 36 in rotational engagement with the hub 30 thereby removing substantially all of the wobble from the spray arm during rotation of the support member 36. While a ball bearing has been employed in the embodiment shown herein, it should be understood that other friction reducing bearings may be used to carry out the present invention.

In order to minimize or substantially eliminate leakage of washing liquid flowing to the spray arm 16 from passing between the stationary hub 30 and the rotating support member 36 and into the bearing area 43 a flat ring shaped seal 54 is provided. The seal 54 is made of flexible resilient material such as polytetrafluorethylene and is secured to the member 36 at its outer circumferentially disposed edge and has its inner free edge disposed so as to rest on and engage the upper end or lip 58 of the hub member 30. Means are also provided in the present embodiment to allow any liquid or food that may have leaked past the seal 54 to flow through the area 43 and past the bearing 44. To this end, a plurality of spaced openings 56 are provided on the wall 41. As best seen in FIG. 2 the top of the openings 56 are located above the bearing 44 so that liquid entering the area 43 by leaking past seal 54 flows through area 43 and past the bearing 44.

Although the upper end of the assembly 36 may be sealed by the cap 40, there is preferably provided a spray tower 60 in accordance with the disclosure of U.S. Pat. No. 3,007,200, to which reference is made for a more complete description thereof. Spray towers are normally stored in a housing provided for that purpose, and are elevated into operative position by the thrust of washing liquid. These housings, because of the particular spray arm support arrangement, are usually located above the inlet areas of the spray arm, and as a result, extend through the rack or rack area. To this end provisions are made in the rack for allowing the withdrawal of the rack from the machine for loading or unloading. This has resulted in decreased capacities since a portion of the rack was eliminated. However, by the present invention due to the location of the bearing arrangement which affords a clear unrestricted liquid inlet into the spray arm the spray tower 60 is supported for movement within the outlet area 24 and therefore below the dish rack 14. The delivery of pressurized washing liquid into the pump inlet causes the spray tower 60 to move upwardly through an opening 62 formed in cap 40 until a shoulder 64 on the lower end of the tower engages the edge portion of the opening as illustrated in dotted outline in FIG. 2. The spray tower 60 provides an elevated spray opening above the lower rack to impart washing liquid at an elevated location within the tub 11. In summary, the location of the bearing 44 in the present embodiment provides an unrestricted liquid inlet 32 which permits the spray tower 60 to be located substantially below the spray arm 16 and out of the path of the dish rack 14. Wobble of the spray tower 60 is minimized by the relatively large diameter thrust bearing 44 and possible clogging of the bearing 44 with food particles is minimized by the existence of seal 54 in conjunction with openings 56 which bypass water around the bearing 44.

While in accordance with the Patent Statutes there has been described what, at present, in considered to be the preferred embodiment of the invention, it will be obvious to those skilled in the art that various changes and modifications may be made thereto without departing from the invention, and it is intended therefore in the appended claims to cover all such changes and modifications as fall within the true spirit and scope of this invention.

What is claimed as new and is desired to be secured by Letters Patent of the United States is:

1. A dishwashing machine including a tub for receiving articles to be washed and a spray arm rotatably arranged in said tub for spraying liquid onto said articles;
   a stationary tubular liquid receiving hub member arranged in the bottom wall of said tub defining a liquid inlet;
   a tubular spray arm support member mounted on said hub member for rotation relative thereto when liquid is received through said hub member;
   said spray arm support member having a circumferentially disposed wall spaced outwardly from and parallel to said hub member;
   annular retaining means integral with said hub member projecting toward said circumferentially disposed wall;
   annular support means integral with said circumferentially disposed wall projecting toward said hub member below said annular retaining means;
   friction reducing bearing means arranged between said retaining means and said support means for allowing rotation of said spray arm support member when the thrust of liquid through said liquid inlet causes axial movement of said spray arm support member and engagement of said bearing between said stationary annular retaining means and said annular support means;
   resilient seal means arranged between said hub member and said support member to reduce leakage of liquid passing therebetween to said bearing means; and
   drain openings on said circumferentially disposed wall for allowing liquid leaking past said seal means to drain away from said bearing means.

2. The dishwasher of claim 1 wherein;
   said drain openings extend from a position above said bearing for allowing liquid leaking past said seal means to drain away from and substantially bypass said bearing means.

3. A dishwashing machine including a tub for receiving articles to be washed and a spray arm rotatably arranged in said tub for spraying liquid onto said articles;
   a stationary tubular liquid receiving hub member arranged in the bottom wall of said tub defining a liquid inlet;
   a tubular spray arm support member mounted on said hub member for rotation relative thereto when liquid is received through said hub member;
   said spray arm support member having a circumferentially disposed wall spaced outwardly from and parallel to said hub member;
   annular retaining means integral with said hub member projecting toward said circumferentially disposed wall;
   annular support means integral with said circumferentially disposed wall projecting toward said hub member below said annular retaining means;
   friction reducing bearing means arrranged between said retaining means and said support means for allowing rotation of said spray arm support member when the thrust of liquid through said liquid inlet causes axial movement of said spray arm support member and the engagement of said bearing between said stationary annular retaining means and said annular support means;
   resilient seal means arranged between said hub member and said support member to reduce leakage of liquid passing through hub member to said bearing means;
   drain openings on said circumferentially disposed wall for allowing liquid leaking past said seal means to drain away from said bearing means; and
   a hollow spray tube telescopically mounted within said liquid inlet having a lower end moveable upwardly within said liquid inlet by the thrust of liquid moving through said liquid inlet to project its upper end into said tub to a position above said spray arm.

* * * * *